United States Patent
Wang et al.

(10) Patent No.: US 11,782,123 B2
(45) Date of Patent: Oct. 10, 2023

(54) AREA DETERMINATION SYSTEM, AREA DETERMINATION METHOD, AND PROGRAM

(71) Applicant: Panasonic Intellectual Property Management Co., Ltd., Osaka (JP)

(72) Inventors: Yanfeng Wang, Osaka (JP); Masayuki Amano, Osaka (JP); Nobuyuki Shibano, Hyogo (JP); Yan Rong, Shiga (JP); Mari Nakanishi, Tokyo (JP); Kazuhiro Matsumoto, Osaka (JP); Chihiro Terayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 82 days.

(21) Appl. No.: 17/604,424

(22) PCT Filed: Feb. 21, 2020

(86) PCT No.: PCT/JP2020/007063
§ 371 (c)(1),
(2) Date: Oct. 17, 2021

(87) PCT Pub. No.: WO2020/217685
PCT Pub. Date: Oct. 29, 2020

(65) Prior Publication Data
US 2022/0179037 A1 Jun. 9, 2022

(30) Foreign Application Priority Data
Apr. 25, 2019 (JP) .................. 2019-084619

(51) Int. Cl.
*G01S 5/14* (2006.01)
*G01S 5/02* (2010.01)

(52) U.S. Cl.
CPC .............. *G01S 5/14* (2013.01); *G01S 5/0226* (2013.01); *G01S 5/0273* (2013.01); *G01S 5/02216* (2020.05)

(58) Field of Classification Search
CPC ...... G01S 5/14; G01S 5/02216; G01S 5/0226; G01S 5/0273

(Continued)

(56) References Cited

U.S. PATENT DOCUMENTS 6,140,964 A   10/2000 Sugiura
10,969,461 B1 *  4/2021 O'Neill ................ G01S 5/0226

(Continued)

FOREIGN PATENT DOCUMENTS

EP    3002610 A2 *  4/2016   ............ G01S 19/21
JP    H05-54284 A      3/1993

(Continued)

OTHER PUBLICATIONS

International Search Report for corresponding Application No. PCT/JP2020/007063, dated May 19, 2020.

(Continued)

*Primary Examiner* — Harry K Liu
(74) *Attorney, Agent, or Firm* — Renner, Otto, Boisselle & Sklar, LLP

(57) ABSTRACT

An area determination system includes a decision unit, a calculation unit, and a determination unit. The decision unit decides, based on a strength of a radio signal transmitted from a transmitter and received by a receiver, a location of the transmitter. The calculation unit calculates a presence determination value. The presence determination value is based on a number of times that the location of the transmitter is determined to be in a presence determination region during a presence determination time period. The presence determination region corresponds to a target area. The (Continued)

determination unit, when a presence condition is satisfied, determine that the transmitter is in the target area. The presence condition is that a state where the presence determination value is greater than or equal to a presence threshold continues for a presence determination time.

15 Claims, 10 Drawing Sheets

(58) Field of Classification Search
USPC .......................................................... 342/458
See application file for complete search history.

(56) References Cited

U.S. PATENT DOCUMENTS

| | | |
|---|---|---|
| 2017/0208116 A1 | 7/2017 | Schilit |
| 2019/0222630 A1 | 7/2019 | Schilit |

FOREIGN PATENT DOCUMENTS

| | | | |
|---|---|---|---|
| JP | HI0-51840 A | 2/1998 | |
| JP | 2004-212199 A | 7/2004 | |
| JP | 2007-232592 A | 9/2007 | |
| JP | 2008-299820 A | 12/2008 | |
| JP | 2010-048783 A | 3/2010 | |
| JP | 2016-091481 A | 5/2016 | |
| JP | 2017-207295 A | 11/2017 | |
| JP | 2019-510281 A | 4/2019 | |
| WO | WO-2018159118 A1 * | 9/2018 | ............. B60R 25/24 |

OTHER PUBLICATIONS

Written Opinion for corresponding Application No. PCT/JP2020/007063, dated May 19, 2020.

* cited by examiner

FIG. 4

| | L1 | L2 | L3 | L4 | L5 | L6 | L7 | L8 | L9 | L10 | L11 | L12 | L13 | L14 | L15 | L16 | L17 | L18 | L19 | L20 |
|---|---|---|---|---|---|---|---|---|---|---|---|---|---|---|---|---|---|---|---|---|
| D1 | OK | NG | OK | OK | OK | OK | NG | OK | OK | NG | OK | OK | OK | OK | OK | OK | OK | OK | OK | NG |
| P1 | OK | NG | OK | | | | | | | | | | | | | | | | | |
| P2 | | NG | OK | | | | | | | | | | | | | | | | | |
| P3 | | | OK | OK | OK | OK | NG | OK | OK | NG | OK | | | | | | | | | |
| P4 | | | | OK | OK | OK | NG | OK | OK | NG | OK | | | | | | | | | |
| P5 | | | | | OK | OK | NG | OK | OK | NG | OK | OK | | | | | | | | |
| P6 | | | | | | OK | NG | OK | OK | NG | OK | OK | OK | | | | | | | |
| P7 | | | | | | | NG | OK | OK | NG | OK | OK | OK | OK | | | | | | |
| P8 | | | | | | | | OK | OK | NG | OK | OK | OK | OK | OK | | | | | |
| P9 | | | | | | | | | OK | NG | OK | OK | OK | OK | OK | OK | | | | |
| P10 | | | | | | | | | | | OK | OK | OK | OK | OK | OK | OK | OK | OK | |
| P11 | | | | | | | | | | | | OK | OK | OK | OK | OK | OK | OK | OK | NG |

FIG. 5

| | L21 | L22 | L23 | L24 | L25 | L26 | L27 | L28 | L29 | L30 | L31 | L32 | L33 | L34 | L35 | L36 | L37 | L38 | L39 | L40 |
|---|---|---|---|---|---|---|---|---|---|---|---|---|---|---|---|---|---|---|---|---|
| D2 | OK | NG | NG | NG | NG | NG | NG | NG | OK | NG | OK | NG | NG | NG | NG | NG | OK | NG | OK | NG |
| P21 | | OK | NG | NG | NG | NG | NG | NG | OK | NG | | | | | | | | | | |
| P22 | | | NG | NG | NG | NG | NG | NG | OK | NG | OK | | | | | | | | | |
| P23 | | | | NG | NG | NG | NG | NG | OK | NG | OK | NG | | | | | | | | |
| P24 | | | | | NG | NG | NG | NG | OK | NG | OK | NG | NG | | | | | | | |
| P25 | | | | | | NG | NG | NG | OK | NG | OK | NG | NG | NG | | | | | | |
| P26 | | | | | | | NG | NG | OK | NG | OK | NG | NG | NG | NG | | | | | |
| P27 | | | | | | | | NG | OK | NG | OK | NG | NG | NG | NG | NG | | | | |
| P28 | | | | | | | | | OK | NG | OK | NG | NG | NG | NG | NG | OK | | | |
| P29 | | | | | | | | | | NG | OK | NG | NG | NG | NG | NG | OK | NG | | |
| P30 | | | | | | | | | | | OK | NG | NG | NG | NG | NG | OK | NG | OK | |
| P31 | | | | | | | | | | | | NG | NG | NG | NG | NG | OK | NG | OK | NG |

FIG. 10

|    | L1 | L2 | L3 | L4 | L5 | L6 | L7 | L8 | L9 | L10 | L11 | L12 | L13 | L14 | L15 | L16 | L17 | L18 | L19 | L20 |
|----|----|----|----|----|----|----|----|----|----|-----|-----|-----|-----|-----|-----|-----|-----|-----|-----|-----|
| D1 | OK | NG | OK | OK | OK | OK | NG | OK | OK | NG  | OK  | OK  | OK  | OK  | OK  | OK  | OK  | OK  | OK  | NG  |
| P1 | OK | NG | OK | OK | OK |    |    |    |    |     |     |     |     |     |     |     |     |     |     |     |
| P2 |    |    |    |    |    | OK | NG | OK | OK | NG  | OK  | OK  | OK  | OK  | OK  |     |     |     |     |     |
| P3 |    |    |    |    |    |    |    |    |    |     |     |     |     |     |     | OK  | OK  | OK  | OK  | NG  |
| P4 |    |    |    |    |    |    |    |    |    |     |     |     |     |     |     |     |     |     |     |     |

AREA DETERMINATION SYSTEM, AREA DETERMINATION METHOD, AND PROGRAM

TECHNICAL FIELD

The present disclosure relates to area determination systems, area determination methods, and programs. Specifically, the present disclosure relates to an area determination system, an area determination method, and a program for determining whether or not a transmitter is present in a target area.

BACKGROUND ART

Patent Literature 1 discloses a position recognition system. The position recognition system of Patent Literature 1 includes: senders held by respective individuals; ID sending means each provided to a corresponding one of the senders and each configured to send ID data for identification of a corresponding one of the individuals; and a plurality of receivers installed in respective rooms or restricted spaces. The position recognition system of Patent Literature 1 further includes: a central signal processing device configured to receive the ID data received by the receiver and a signal representing the receiver having received the ID data and to perform position recognition based on the ID data and the signal; and a monitor for displaying a position recognition result obtained by the central signal processing device.

In Patent Literature 1, the position recognition (area determination) is performed depending on which receiver has received the ID data (radio signal) from the sender (transmitter). However, the radio signal from the sender is practically influenced by a surrounding environment, a state of a person who holds the sender (the orientation, the position, or the like of the body), or the like. Thus, the receiver may receive an unintended radio signal, resulting in erroneous recognition of the position of the sender.

CITATION LIST

Patent Literature

Patent Literature 1: JP H05-54284 A

SUMMARY OF INVENTION

It is an object to provide an area determination system, an area determination method, and a program which improve the accuracy of determination of whether or not a transmitter is present in a target area.

An area determination system of an aspect of the present disclosure includes a decision unit, a calculation unit, and a determination unit. The decision unit is configured to decide, based on a strength of a radio signal transmitted from a transmitter and received by a receiver, a location of the transmitter. The calculation unit is configured to calculate a presence determination value. The presence determination value is based on a number of times that the location of the transmitter is determined to be in a presence determination region during a presence determination time period. The presence determination region corresponds to a target area. The determination unit is configured to, when a presence condition is satisfied, determine that the transmitter is in the target area. The presence condition is that a state where the presence determination value is greater than or equal to a presence threshold continues for a presence determination time.

An area determination method of another aspect of the present disclosure includes a decision step, a calculation step, and a determination step. The decision step is a step of deciding, based on a strength of a radio signal transmitted from a transmitter and received by a receiver, a location of the transmitter. The calculation step is a step of calculating a presence determination value. The presence determination value is based on a number of times that the location of the transmitter is determined to be in a presence determination region during a presence determination time period. The presence determination region corresponds to a target area. The determination step includes, when a presence condition is satisfied, determining that the transmitter is in the target area. The presence condition is that a state where the presence determination value is greater than or equal to a presence threshold continues for a presence determination time.

A program of still another aspect of the present disclosure is a program configured to cause one or more processors to execute the area determination method.

BRIEF DESCRIPTION OF DRAWINGS

FIG. 4 is a view illustrating a method for calculating a presence determination value in the area determination system;

FIG. 5 is a view illustrating a method for calculating an absence determination value in the area determination system;

FIG. 10 is a view illustrating a method for calculating a presence determination value in an area determination system of a variation.

DESCRIPTION OF EMBODIMENTS

1. Embodiment

1.1 Schema

Figure 1:
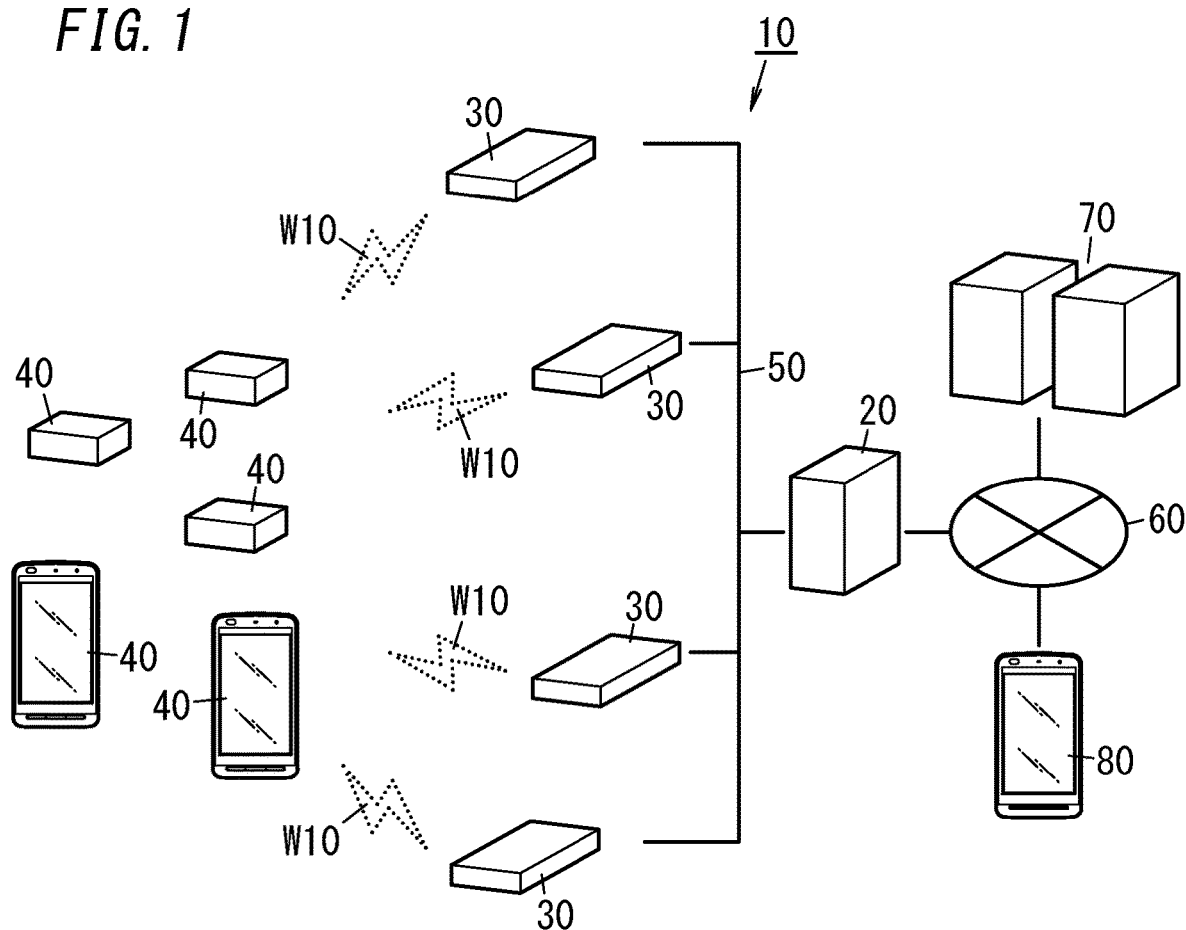
FIG. 1 is a view illustrating an area determination system of an embodiment.
Figure 2:
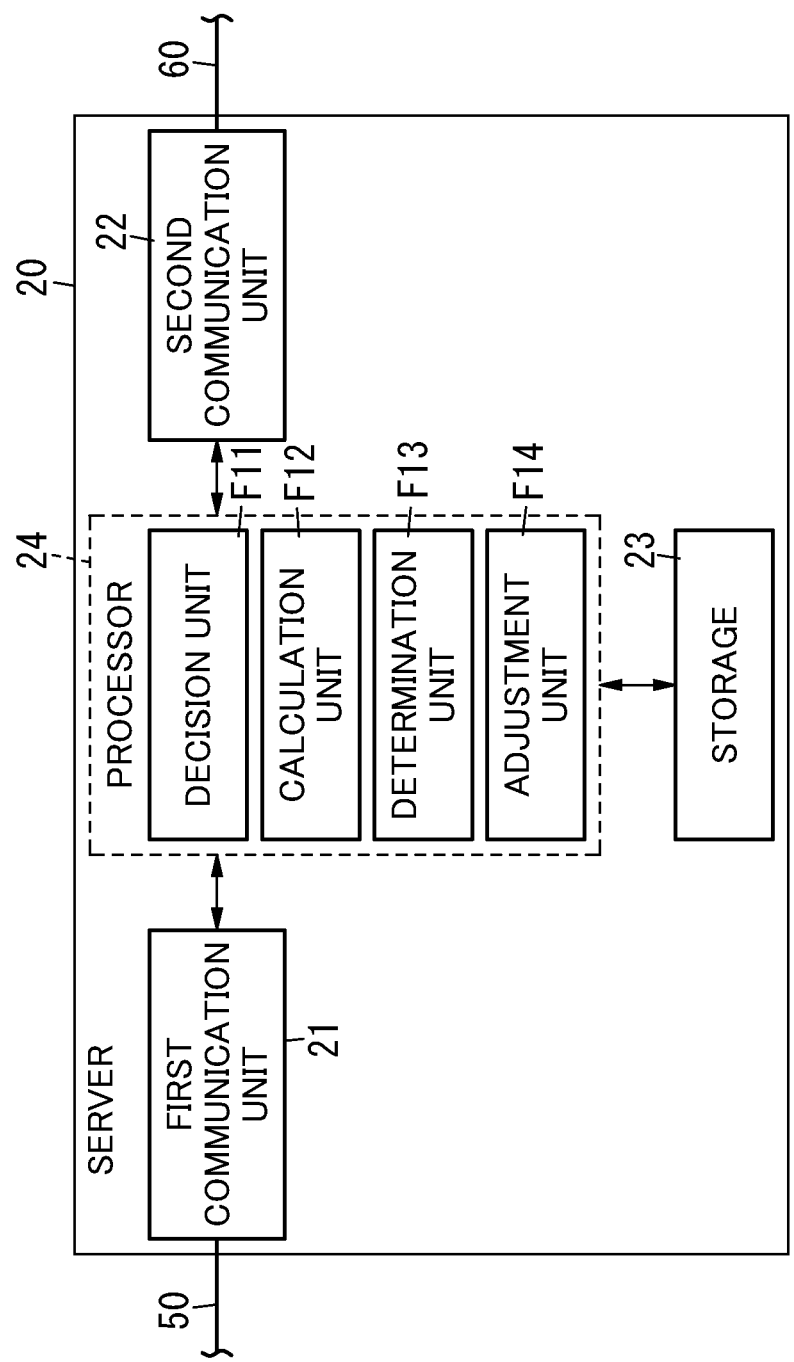
FIG. 2 is a block diagram illustrating a server of the area determination system.
Figure 3:
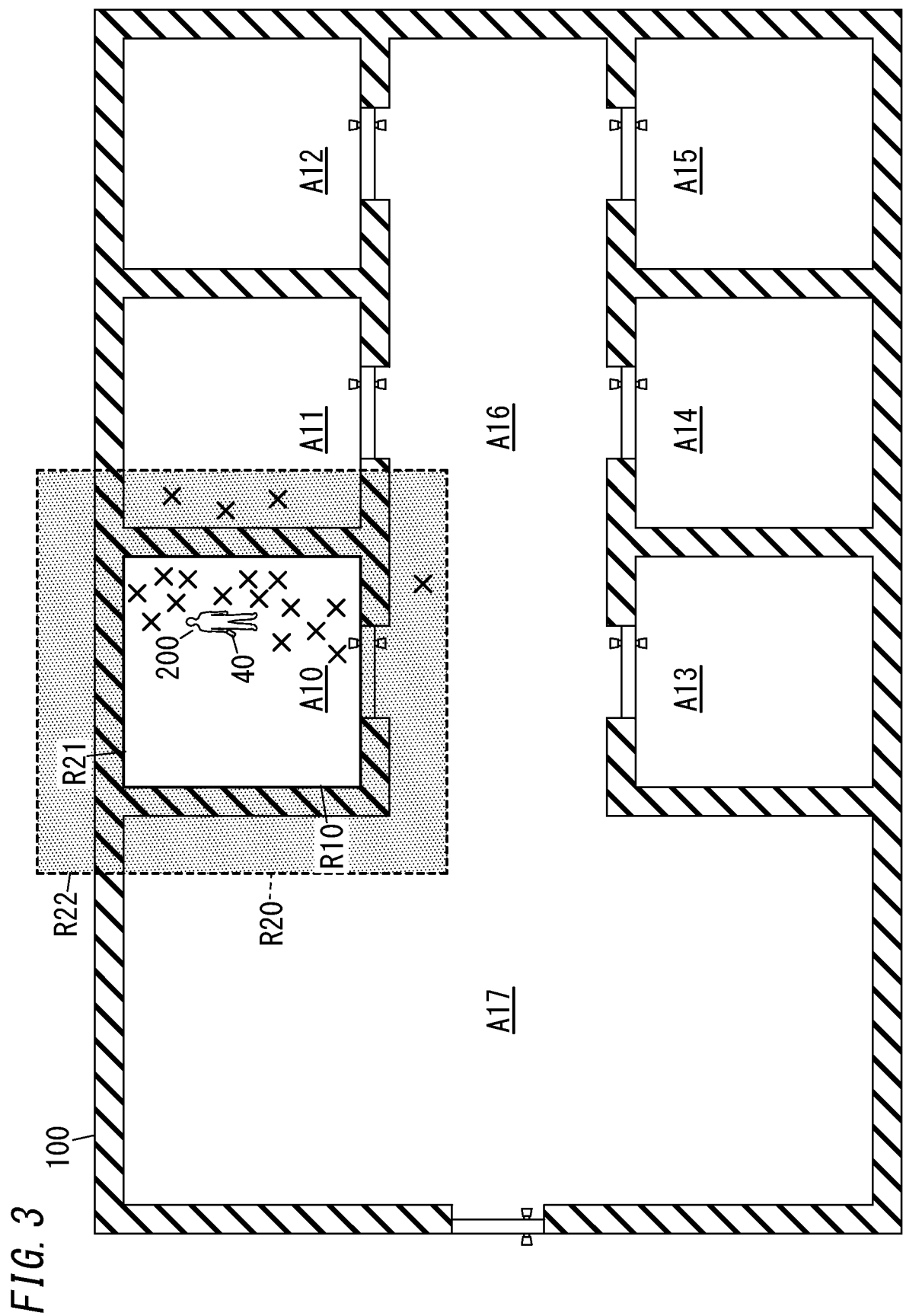
FIG. 3 is a view illustrating a target area of the area determination system.

FIG. 1 shows an area determination system 10 of an embodiment. The area determination system 10 includes a server 20. As illustrated in FIG. 2, the server 20 includes a decision unit F11, a calculation unit F12, and a determination unit F13. As illustrated in FIG. 1, the decision unit F11 is configured to decide, based on the strength of a radio signal W10 transmitted from a transmitter 40 and received by a receiver 30, a location of the transmitter 40. As illustrated in FIG. 3, the calculation unit F12 is configured to calculate a presence determination value. The presence determination value is based on a number of times that the location of the transmitter 40 is determined to be in a presence determination region R10 during a presence determination time period. The presence determination region (R10) corresponds to a target area. The determination unit F13 is configured to, when a presence condition is satisfied, determine that the transmitter 40 is in the target area. The presence condition is that a state where the presence determination value is greater than or equal to a presence threshold continues for a presence determination time.

The area determination system 10 does not determine simply whether or not the location, which is based on the strength of the radio signal W10 received by the receiver 30, of the transmitter 40 is in the target area. Rather, the area determination system 10 determines, based on the presence determination value, whether or not the transmitter 40 is in the target area. The presence determination value is a value based on the number of times that the location of the transistor 40 is determined to be in the presence determination region R10 corresponding to the target area during a presence determination time period. In addition, the transmitter 40 is determined to be in the target area when the presence condition that the state where the presence determination value is greater than or equal to the presence threshold continues for the presence determination time is satisfied. Therefore, even when the receiver 30 cannot correctly receive the radio signal W10 from the transmitter 40 or even when the radio signal W10 exhibits an unintended behavior, the possibility that whether or not the transmitter 40 is in the target area can be accurately determined is high. Thus, the area determination system 10 can improve the accuracy of determination as to whether or not the transmitter 40 is present in the target area.

1.2 Details

With reference to FIGS. 1 to 6, the area determination system 10 of the present embodiment will be described further in detail below. As illustrated in FIG. 3, the area determination system 10 is a system for determining whether or not a person 200 holding the transmitter 40 is present in the target area in a facility 100. That is, the area determination system 10 has an aspect as a local positioning system (LPS) for identifying the position of the person 200 in the facility 100.

In the present embodiment, the facility 100 is an office building. As illustrated in FIG. 3, the facility 100 includes a plurality of (in the example shown in the figure, eight) areas A10 to A17. In this case, each of the areas A10 to A15 is a meeting room. The area A16 is a corridor to the areas A10 to A15, and the area A17 is a hall. Note that examples of the facility 100 include, in addition to an office building, a detached house, a multi-residential complex (residential units, a common area), a retail establishment, a building (a building as a whole, a facility on a floor of a building). Moreover, the facility 100 is not limited to a building structure but may be premises including a building structure and its land. For example, the facility 100 may be a factory, a park, a hospital, or a commercial facility.

As illustrated in FIG. 1, the area determination system 10 includes the server 20, a plurality of receivers 30, and a plurality of transmitters 40. Moreover, the area determination system 10 is configured to communicate with a service delivery system 70 via a communication network 60. The communication network 60 may include the Internet. The communication network 60 may include a network compliant with a single communication protocol, or a plurality of networks compliant with different communication protocols. The communication protocol may be selected from well-known various wired and wireless communication standards. Although simplified in FIG. 1, the communication network 60 may include data communication devices such as a repeater hub, a switching hub, a bridge, a gateway, and a router.

The area determination system 10 is configured to provide the service delivery system 70 with a result of determination as to whether or not the person 200 holding the transmitter 40 is present in the target area in the facility 100 (presence/absence information on the person 200 in the target area in the facility 100) as necessary. The service delivery system 70 is a system for providing a terminal apparatus 80 with services. The service delivery system 70 is configured to communication with the terminal apparatus 80 via the communication network 60. The service delivery system 70 provides, based on the presence/absence information on the person 200 in the target area in the facility 100, the terminal apparatus 80 with a service of presenting various types of information. The presence/absence information is information which the service delivery system 70 has received from the area determination system 10.

The transmitter 40 is used to identify the location of the person 200. That is, provided that the person 200 carries the transmitter 40, the location of the transmitter 40 is regarded as the location of the person 200. Each transmitter 40 has a function of transmitting the radio signal W10. In particular, the transmitters 40 regularly transmit respective radio signals W10. Each radio signal W10 may include identification information on a corresponding one of the transmitters 40. The pieces of identification information are used to distinguish the plurality of transmitters 40 from each other. In the present embodiment, the medium of the radio signals W10 is a radio wave. In particular, the medium of the radio signals W10 is a radio wave adapted to near field communication. Examples of the near field communication include Bluetooth (registered trademark), and in particular, Bluetooth Low Energy (BLE) is available. The transmitter 40 has a size and a weight portable by the person 200. Examples of the transmitter 40 include beacons. Moreover, the transmitters 40 may be implemented as portable terminals such as smartphones, tablet terminals, wearable terminals, or personal computers.

Each receiver 30 is used to identify the location of the transmitter 40 (i.e., the location of the person 200 carrying the transmitter 40). The receivers 30 have a function of receiving radio signals W10 from the transmitters 40. Moreover, the receivers 30 are communicatively connected to the server 20. That is, each receiver 30 is configured to communication with the server 20 via a communication network 50. When the receiver 30 receives the radio signal W10 from the transmitter 40, the receiver 30 transmits the identification information included in the radio signal W10 and the strength of the radio signal W10 to the server 20 via the communication network 50. The strength of the radio signal W10 is, for example, a Received Signal Strength Indicator (RSSI). For example, the receiver 30 is installed in a target area in the facility 100. When the target area is located indoors, the receiver 30 may be disposed on a ceiling in the target area. Moreover, a plurality of receivers 30 may be disposed in the target area. Disposing the plurality of receivers 30 is expected to improve the accuracy of identifying the location of the transmitter 40.

The communication network 50 may include a local area network. The communication network 50 may include a network compliant with a single communication protocol, or a plurality of networks compliant with different communication protocols. The communication protocol may be selected from well-known various wired and wireless communication standards. Although simplified in FIG. 1, the communication network 50 may include data communication devices such as a repeater hub, a switching hub, a bridge, a gateway, and a router.

As illustrated in FIG. 2, the server 20 includes a first communication unit 21, a second communication unit 22, a storage 23, and a processor 24.

The first communication unit 21 is a communication interface. In particular, the first communication unit 21 is a communication interface connectable to the communication network 50 and has a function of performing communication via the communication network 50. That is, the server 20 is configured to communicate with the receivers 30 via the communication network 50. Note that the communication protocol of the first communication unit 21 may be selected from well-known various wired and wireless communication standards.

The second communication unit 22 is a communication interface. In particular, the second communication unit 22 is a communication interface connectable to the communication network 60 and has a function of performing communication via the communication network 60. In particular, the second communication unit 22 is configured to communicate with the service delivery system 70 via the communication network 60. Note that the communication protocol of the second communication unit 22 may be selected from well-known various wired and wireless communication standards.

The storage 23 is a device for storing information. The storage 23 is, for example, Read Only Memory (ROM), Random Access Memory (RAM), or Electrically Erasable Programmable Read Only Memory (EEPROM). The storage 23 has an area for storing information for determination. The information for determination is to be used for determination as to whether or not the transmitter 40 is present in the target area. For example, the information for determination includes information on the target area, information on the receiver 30, and information on the transmitter 40. The information on the target area is information for identifying the size, the shape, and the like of the target area. The information on the receiver 30 includes information indicating the location of the receiver 30 with respect to the target area. The information on the transmitter 40 includes information for identifying the transmitter 40 (identification information).

The processor 24 is configured to perform general control of the server 20, that is, to control the first communication unit 21, the second communication unit 22, and the storage 23. The processor 24 may be implemented as a computer system including one or more processors (microprocessors) and one or more memory elements. That is, the one or more processors execute one or more programs (applications) stored in the one or more memory elements to provide functions as the processor 24. In this embodiment, the one or more programs are stored in advance in the one or more memory elements of the processor 24. However, this is only an example and should not be construed as limiting. The one or more programs may also be downloaded via a telecommunications network such as the Internet or may be distributed after having been stored in a non-transitory storage medium such as a memory card.

As illustrated in FIG. 2, the processor 24 includes the decision unit F11, the calculation unit F12, the determination unit F13, and an adjustment unit F14. In FIG. 2, the decision unit F11, the calculation unit F12, the determination unit F13, and the adjustment unit F14 do not necessarily represent physical components but represent functions implemented by the processor 24.

The decision unit F11 is configured to decide, based on the strength of the radio signal W10 transmitted from the transmitter 40 and received by the receiver 30, the location of the transmitter 40. In particular, in the present embodiment, the decision unit F11 decides the location of the transmitter 40 in accordance with the location of the receiver 30 and the strength of the radio signal W10. The strength of the radio signal W10 decreases as the distance between the receiver 30 and the transmitter 40 increases. Thus, the distance of the transmitter 40 from the receiver 30 is obtainable from the strength of the radio signal W10 transmitted from the transmitter 40. From the location, which is stored in the storage 23, of the receiver 30 with respect to the target area, the decision unit F11 decides a range (e.g., a circumference centering the receiver 30) within which the transmitter 40 can be present. The decision unit F11 obtains, from different receivers 30, ranges within which the transmitter 40 can be present, and the decision unit F11 adopts, as the location of the transmitter 40, a location at which all the ranges overlap each other. Note that the method described above is a mere example, and the decision unit F11 may adopt another method to decide the location of the transmitter 40. That is, various types of methods have been provided as methods for identifying the location of a generation source of a radio signal in accordance with the strength of the radio signal, and therefore, the decision unit F11 may adopt a known method to decide the location of the transmitter 40.

The calculation unit F12 calculates the presence determination value. The presence determination value is a value based on the number of times that the location of the transistor 40 is determined to be in the presence determination region R10 corresponding to the target area (area A10) during the presence determination time period.

A method for calculating the presence determination value will be described with reference to FIGS. 3 and 4. First of all, the presence determination region R10 is a region set for determination that the transmitter 40 is in the target area. In the present embodiment, the presence determination region R10 corresponds to the target area (area A10). In FIG. 3, "x" marks represent locations of the transmitter 40 which have been decided by the decision unit F11. In FIG. 4, D1 represents time-series data of the locations of the transmitter 40 which have been decided by the decision unit F11, and D1 includes twenty locations L1 to L20. FIG. 4 shows, for each of the locations L1 to L20, a result of determination as to whether or not the location of the transmitter 40 which has been decided by the decision unit F11 is in the presence determination region R10. Here, "OK" means that the location of the transmitter 40 which has been decided by the decision unit F11 is in the presence determination region R10, and "NG" means that the location of the transmitter 40 which has been decided by the decision unit F11 is not in the presence determination region R10.

The presence determination time period has a length required to obtain a target number of locations of the transmitter 40 by the decision unit F11. The presence determination time period is accordingly set in consideration of the target number of locations of the transmitter 40, a transmission cycle of the radio signal W10 from the transmitter 40, and a reception cycle of the radio signal W10 by the receiver 30. In the example shown in FIG. 4, P1 to P11 represent presence determination time periods, and the target number of locations of the transmitter 40 is 10. For example, each of the presence determination time period may be set to 10 seconds if the transmission cycle of the transmitter 40 is one second, and the reception cycle of the receiver 30 is set such that the receiver 30 can receive the radio signal W10 each time the transmitter 40 transmits the radio signal W10. In the present embodiment, each presence determination time period is set to partially overlap its directly preceding presence determination time period. For example, the presence determination time period P1 corresponds to ten locations L1 to L10. The presence determination time period P2 following the presence determination time period P1 corresponds to ten locations L2 to L11. Thus, the presence determination time period Pb and the presence determination time period P2 overlap each other in terms of the locations L2 to L10.

In the present embodiment, the presence determination value is a value based on the ratio of the number of times of determination that the location of the transmitter 40 is in the presence determination region R10 to the number of times of determination as to whether or not the location of the transmitter 40 is in the presence determination region R10 during the presence determination time period. That is, the presence determination value corresponds to the probability that the location of the transmitter is in the presence determination region R10 during the presence determination time period. For example, the presence determination value is represented by percentage. In FIG. 4, during each of the presence determination time periods P1 to P10, the number of times of determination as to whether or not the location of the transmitter 40 is in the presence determination region R10 is 10. During the presence determination time period P1, the number of times of determination that the location of the transmitter 40 is in the presence determination region R10 is 7. Thus, the presence determination value during the presence determination time period P1 is 70%. Similarly, the presence determination values during the presence determination time periods P2, P3, P4, P5, P6, P7, P8, P9, P10, and P11 are respectively 70%, 80%, 80%, 80%, 80%, 80%, 90%, 90%, 90%, and 90%.

In addition, the calculation unit F12 calculates an absence determination value. The absence determination value is a value based on the number of times of determination that the location of the transistor 40 is not in the absence determination region R20 corresponding to the target area (area A10) during an absence determination time period.

A method for calculating the absence determination value will be described with reference to FIGS. 3 and 5. The absence determination region R20 is a region set for determination that the transmitter 40 is not in the target area. In the present embodiment, the absence determination region R20 is an area including the entirety of the target area (area A10) and is larger than the target area (area A10). Thus, the presence determination region R10 and the absence determination region R20 have different sizes with respect to the target area. In particular, the absence determination region R20 includes a reference region R21 corresponding to the target area (area A10) and an extended region R22 which is not included in the target area. The extended region R22 is a rectangular frame-shaped region and surrounds the entire perimeter of the reference region R21. In FIG. 5, D2 represents time-series data of the locations of the transmitter 40 which have been decided by the decision unit F11, and D2 includes twenty locations L21 to L40. FIG. 5 shows, for each of the locations L21 to L40, a result of determination as to whether or not the location of the transmitter 40 which has been decided by the decision unit F11 is in the absence determination region R20. Here, "OK" means that the location of the transmitter 40 which has been decided by the decision unit F11 is in the absence determination region R20, and "NG" means that the location of the transmitter 40 which has been decided by the decision unit F11 is not in the absence determination region R20 (i.e., is outside the absence determination region R20).

In a similar manner to the presence determination time period, the absence determination time period has a length required to obtain a target number of locations of the transmitter 40 by the decision unit F11. The absence determination time period is accordingly set in consideration of the target number of locations of the transmitter 40, a transmission cycle of the radio signal W10 from the transmitter 40, and a reception cycle of the radio signal W10 by the receiver 30. In the example shown in FIG. 5, P21 to P31 represent absence determination time periods, and the target number of locations of the transmitter 40 is 10. For example, the absence determination time period may be set to 10 seconds if the transmission cycle of the transmitter 40 is one second, and the reception cycle of the receiver 30 is set such that the receiver 30 can receive the radio signal W10 each time the transmitter 40 transmits the radio signal W10. In the present embodiment, each absence determination time period is set to partially overlap its directly preceding absence determination time period. For example, the absence determination time period P21 corresponds to ten locations L21 to L30. The absence determination time period P22 following the absence determination time period P21 corresponds to ten locations L22 to L31. Thus, the absence determination time period P21 and the absence determination time period P22 overlap each other in terms of the locations L22 to L30.

In the present embodiment, the absence determination value is a value based on the ratio of the number of times of determination that the location of the transmitter 40 is not in the absence determination region R20 to the number of times of determination as to whether or not the location of the transmitter 40 is outside the absence determination region R20 during the absence determination time period. That is, the absence determination value corresponds to the probability that the location of the transmitter is in the absence determination region R20 during the absence determination time period. For example, the absence determination value is represented by percentage. In FIG. 5, during each of the absence determination time periods P21 to P30, the number of times of determination as to whether or not the location of the transmitter 40 is outside the absence determination region R20 is 10. During the absence determination time period P21, the number of times of determination that the location of the transmitter 40 is outside the absence determination region R20 is 8. Thus, the absence determination value during the absence determination time period P21 is 80%. Similarly, the absence determination values during the absence determination time periods P22, P23, P24, P25, P26, P27, P28, P29, P30, and P31 are respectively 80%, 80%, 80%, 80%, 80%, 80%, 70%, 70%, 70%, and 70%.

Thus, the calculation unit F12 calculates the presence determination value and the absence determination value from the time-series data, which has been calculated by the decision unit F11, of the locations of the transmitter 40. The presence determination value and the absence determination value are used for determination by the determination unit F13.

When the presence condition is satisfied, the determination unit F13 determines that the transmitter 40 is in the target area. The presence condition is the condition that the state where the presence determination value is greater than or equal to the presence threshold continues for the presence determination time. The presence threshold and the presence determination time are values for making a decision of whether or not the transmitter 40 is actually present in the target area. The presence threshold is, for example, 70%. In the present embodiment, the presence determination time is 10 seconds. In the example shown in FIG. 4, the presence determination value is 70% and is greater than or equal to the presence threshold during the presence determination time period P1. Also during each of the following presence determination time periods P2 to P11, the presence determination value is greater than or equal to 70% and is greater than or equal to the presence threshold. The presence determination values of consecutive periods from the presence determination time period P1 to the presence determination time period P11, which is a time period 10 seconds after the presence determination time period P1, are each greater than or equal to the presence threshold, and the determination unit F13 thus determines that the presence condition is satisfied and that the transmitter 40 is in the target area. If the presence condition is not satisfied, whether or not the transmitter 40 is in the target area cannot be determined (is indeterminable) by the determination unit F13 at this moment.

When the absence condition is satisfied, the determination unit F13 determines that the transmitter 40 is not in the target area. The absence condition is the condition that a state where the absence determination value is greater than or equal to the absence threshold continues for an absence determination time. The absence threshold and the absence determination time are values for making a decision of whether or not the transmitter 40 is actually present in the target area. The absence threshold is, for example, 70%. In the present embodiment, the absence determination time is 10 seconds. In the example shown in FIG. 5, the presence determination value is 80% and is greater than or equal to the absence threshold during the absence determination time period P21. Also during each of the following absence determination time periods P22 to P31, the absence determination value is greater than or equal to 70% and is greater than or equal to the absence threshold. The absence determination values of consecutive periods from the absence determination time period P21 to the absence determination time period P31, which is a time period 10 seconds after the absence determination time period P21, are each greater than or equal to the absence threshold, and the determination unit F13 thus determines that the absence condition is satisfied and that the transmitter 40 is outside the target area. If the absence condition is not satisfied, whether or not the transmitter 40 is in the target area cannot be determined (is indeterminable) by the determination unit F13 at this moment.

The adjustment unit F14 adjusts, based on the location of the transmitter 40, at least one of the presence determination region R10 or a combination of the presence determination time period and the presence determination time. In the present embodiment, the adjustment unit F14 adjusts, based on the distribution of the locations of the transmitter 40 which have been decided by the decision unit F11, at least one of the presence determination region R10 or the combination of the presence determination time period and the presence determination time. For example, when the dispersion (or standard deviation) of the distribution of the locations of the transmitter 40 which have been decided by the decision unit F11 is greater than or equal to a threshold, the adjustment unit F14 may increase at least one of the presence determination time period or the presence determination time. That is, the adjustment unit F14 may increase the number of locations, which is to be used for calculation of the presence determination value, of the transmitter 40 and/or the number of presence determination values to be used for determination by the determination unit F13 so as to improve the accuracy of determination by the determination unit F13. In contrast, when the dispersion of the distribution (or standard deviation) of the locations of the transmitter 40 which have been decided by the decision unit F11 is less than the threshold, the adjustment unit F14 may reduce at least one of the presence determination time period or the presence determination time. That is, when the locations of the transmitter 40 are highly-accurately obtained by the decision unit F11, the adjustment unit F14 can reduce the number of locations, which is to be used for calculation of the presence determination value, of the transmitter 40 so as to reduce a time required for determination. Moreover, when the distribution of the locations of the transmitter 40 which have been decided by the decision unit F11 is unevenly biased toward an end of the target area, the adjustment unit F14 may increase at least one of the presence determination time period or the presence determination time. In contrast, when the distribution of the locations of the transmitter 40 which have been decided by the decision unit F11 is unevenly biased toward the center of the target area, the adjustment unit F14 may reduce at least one of the presence determination time period or the presence determination time. For example, when the dispersion (or standard deviation) of the distribution of the locations of the transmitter 40 which have been decided by the decision unit F11 is greater than or equal to a threshold, the adjustment unit F14 may increase the presence determination region R10. For example, the presence determination region R10 may be increased to an area greater than or equal to the target area. This improves the accuracy of the determination by the determination unit F13 when the locations of the transmitter 40 are not highly accurately decided by the decision unit F11. Moreover, when the distribution of the locations of the transmitter 40 which have been decided by the decision unit F11 is unevenly biased toward an end of the target area, the adjustment unit F14 may extend the presence determination region R10 outward beyond the edge of the target area. This can improve the accuracy of the determination by the determination unit F13 even when the transmitter 40 is highly possibly at the end of the target area.

In addition, the adjustment unit F14 adjusts, based on the location of the transmitter 40, either the absence determination region R20 or a combination of the absence determination time period and the absence determination time. In the present embodiment, the adjustment unit F14 adjusts, based on the distribution of the locations, which have been decided by the decision unit F11, of the transmitter 40, either the absence determination region R20 or the combination of the absence determination time period and the absence determination time. For example, when the dispersion (or standard deviation) of the distribution of the locations of the transmitter 40 which have been decided by the decision unit F11 is greater than or equal to a threshold, the adjustment unit F14 may increase at least one of the absence determination time period or the absence determination time. That is, the adjustment unit F14 may increase the number of locations, which is to be used for calculation of the absence determination value, of the transmitter 40 and/or the number of absence determination values to be used for determination by the determination unit F13 so as to improve the accuracy of determination by the determination unit F13. In contrast, when the dispersion of the distribution (or standard deviation) of the locations of the transmitter 40 which have been decided by the decision unit F11 is less than the threshold, the adjustment unit F14 may reduce at least one of the absence determination time period or the absence determination time. That is, when the locations of the transmitter 40 are highly-accurately obtained by the decision unit F11, the adjustment unit F14 can reduce the number of locations, which is to be used for calculation of the absence determination value, of the transmitter 40 so as to reduce a time required for determination. Moreover, when the distribution of the locations of the transmitter 40 which have been decided by the decision unit F11 is unevenly biased toward an end of the target area, the adjustment unit F14 may increase at least one of the absence determination time period or the absence determination time. In contrast, when the distribution of the locations of the transmitter 40 which have been decided by the decision unit F11 is unevenly biased toward the center of the target area, the adjustment unit F14 may reduce at least one of the absence determination time period or the absence determination time. For example, when the dispersion (or standard deviation) of the distribution of the locations of the transmitter 40 which have been decided by the decision unit F11 is greater than or equal to a threshold, the adjustment unit F14 may increase at least one of the absence determination region R20. That is, the extended region R22 of the absence determination region R20 may be further extended. This improves the accuracy of the determination by the determination unit F13 when the locations of the transmitter 40 are not highly accurately decided by the decision unit F11. Moreover, when the distribution of the locations of the transmitter 40 which have been decided by the decision unit F11 is unevenly biased toward an end of the target area, the adjustment unit F14 may reduce the absence determination region R20 to an end side of the target area. This can improve the accuracy of the determination by the determination unit F13 even when the transmitter 40 is highly possibly at the end of the target area.

1.3 Operation

Figure 6:
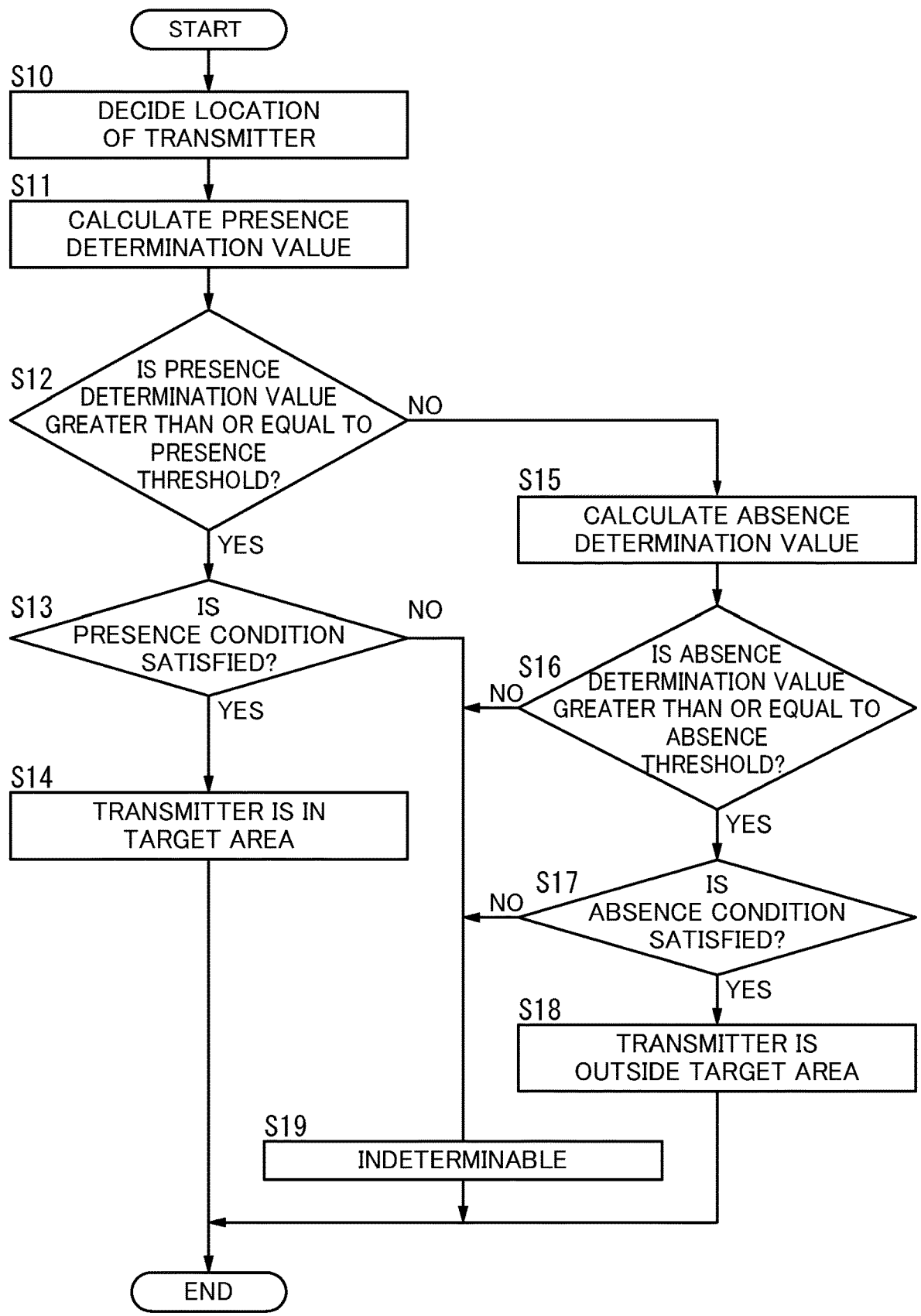
FIG. 6 is a flowchart illustrating an example of operation of the area determination system.

Next, an example of the operation of the area determination system 10 will be briefly explained with reference to the flowchart in FIG. 6. In the flowchart shown in FIG. 6, processes performed by the adjustment unit F14 are omitted to simplify the description. The processes by the adjustment unit F14 may be accordingly executed while the processes shown in FIG. 6 are executed, or before or after the processes shown in FIG. 6 are executed.

First of all, the area determination system 10 decides the locations of the transmitter 40 (S10). Then, the area determination system 10 calculates the presence determination value (S11). Next, the area determination system 10 checks whether or not the presence determination value is greater than or equal to the presence threshold (S12). If the presence determination values is greater than or equal to the presence threshold (S12: Yes), the area determination system 10 checks whether or not the presence condition is satisfied (S13). If the presence condition is satisfied (S13: Yes), the area determination system 10 determines that the transmitter 40 is in the target area (S14).

In step S12, if the presence determination value is less than the threshold (S12: No), the area determination system 10 calculates the absence determination value (S15). Then, the area determination system 10 checks whether or not the absence determination value is greater than or equal to the absence threshold (S16). If the absence determination value is greater than or equal to the absence threshold (S16: Yes), the area determination system 10 checks whether or not the absence condition is satisfied (S17). If the absence condition is satisfied (S17: Yes), the area determination system 10 determines that the transmitter 40 is outside the target area (S18).

Note that if in step S13, the presence condition is not satisfied (S13: No), whether or not the transmitter 40 is in the target area cannot be determined (is indeterminable) by the area determination system 10 at this moment (S19). If in step S16, the absence determination value is less than the absence threshold (S16: No), or if in step S17, the absence condition is not satisfied (S17: No), whether or not the transmitter 40 is in the target area cannot be determined (is indeterminable) by the area determination system 10 at this moment (S19).

1.4 Summary

As illustrated in FIG. 2, the area determination system 10 described above includes the decision unit F11, the calculation unit F12, and the determination unit F13. As illustrated in FIG. 1, the decision unit F11 is configured to decide, based on the strength of a radio signal W10 transmitted from a transmitter 40 and received by a receiver 30, a location of the transmitter 40. As illustrated in FIG. 3, the calculation unit F12 is configured to calculate a presence determination value. The presence determination values is based on a number of times that the location of the transmitter 40 is determined to be in a presence determination region R10 during a presence determination time periods. The presence determination region (R10) corresponds to a target area. The determination unit F13 is configured to, when a presence condition is satisfied, determine that the transmitter 40 is in the target area. The presence condition is that a state where the presence determination value is greater than or equal to a presence threshold continues for a presence determination time. Such an area determination system 10 can improve the accuracy of determination as to whether or not the transmitter 40 is present in the target area.

In other words, the area determination system 10 executes the following method (area determination method). The area determination method includes a decision step (S10), a calculation step (S11), and a determination step (S13, S14). The decision step (S10) is a step of deciding, based on the strength of the radio signal W10 transmitted from the transmitter 40 and received by the receiver 30, the location of the transmitter 40. The calculation step (S11) is a step of calculating a presence determination value. The presence determination value is based on a number of times that the location of the transmitter (40) is determined to be in a presence determination region (R10) during a presence determination time periods. The presence determination region (R10) corresponds to a target area. The determination step (S13, S14) is a step of, when the presence condition is satisfied, determining that the transmitter 40 is in the target area. The presence condition is that the state where the presence determination value is greater than or equal to the presence threshold continues for the presence determination time. In a similar manner to the area determination system 10, such an area determination method can improve the accuracy of determination as to whether or not the transmitter 40 is present in the target area.

The area determination system 10 includes one or more processors. That is, the area determination system 10 is realized by a program (area determination program) executed by the one or more processors. This program is a program (computer program) for causing the one or more processors to execute the area determination method. In a similar manner to the area determination method, such a program can improve the accuracy of determination as to whether or not the transmitter 40 is present in the target area.

2. Variation

The embodiment according to the present disclosure is not limited to the above-described embodiment. Rather, the exemplary embodiment may be readily modified in various manners depending on a design choice or any other factor without departing from the scope of the present disclosure. Variations of the above-described embodiment will be described below.

In one variation, the determination unit F13 may determine that the presence condition is satisfied when the number of times of determination that the presence determination value is greater than or equal to the presence threshold is greater than or equal to the number of times of presence. The number of times of presence corresponds to a value for determination as to whether or not the transmitter 40 is actually present in the target area. For example, the presence threshold is 70%, and the number of times of presence is 10. In the example shown in FIG. 4, the presence determination value is 70% and is greater than or equal to the presence threshold during the presence determination time period P1. Also during each of the following presence determination time periods P2 to P11, the presence determination value is greater than or equal to 70% and is greater than or equal to the presence threshold. The number of times of determination that the presence determination value is greater than or equal to the presence threshold during the presence determination time period P11 corresponds to the number of times of presence. Thus, the determination unit F13 determines that the presence condition is satisfied and that the transmitter 40 is in the target area.

In another variation, the determination unit F13 may determine that the absence condition is satisfied when the number of times that the absence determination value is greater than or equal to the absence threshold is greater than or equal to the number of absence times. The number of absence times is a value for making a decision of whether or not the transmitter 40 is actually present in the target area. For example, the absence threshold is 70% and the number of absence times is 10. In the example shown in FIG. 5, the absence determination value is 80% and is greater than or equal to the absence threshold during the absence determination time period P21. Also during each of the following absence determination time periods P22 to P31, the absence determination value is greater than or equal to 70% and is greater than or equal to the absence threshold. The number of times that the absence determination value is greater than or equal to the absence threshold during the absence determination time period P31 corresponds to the number of absence times. Thus, the determination unit F13 determines that the absence condition is satisfied and that the transmitter 40 is outside the target area.

In yet another variation, the determination unit F13 may determine that the presence condition is satisfied when a representative value of presence determination values in the presence determination time is greater than or equal to the presence threshold. The representative value of the presence determination values is an average value of presence determination values in the presence determination time. For example, the presence threshold is 70%, and the presence determination time is 10 seconds. In the example shown in FIG. 4, the presence determination values of the presence determination time periods P1 to P10 corresponding to 10 seconds are respectively 70%, 70%, 80%, 80%, 80%, 80%, 80%, 90%, 90%, and 90%. Thus, the representative value (average value) of the presence determination values is 81% and is greater than or equal to the presence threshold. Thus, the determination unit F13 determines that the presence condition is satisfied and that the transmitter 40 is outside the target area. Note that the representative value of the presence determination values is not limited to the average value but may be a median value, the most frequent value, a minimum value, a maximum value, or the like.

In yet still another variation, the determination unit F13 may determine that the absence condition is satisfied when the representative value of the absence determination value in the absence determination time is greater than or equal to the absence threshold. The representative value of the absence determination value is an average value of absence determination values in the absence determination time. For example, the absence threshold is 70%, and the absence determination time is 10 seconds. In the example shown in FIG. 5, the absence determination values of the absence determination time periods P21 to P30 corresponding to 10 seconds are respectively 80%, 80%, 80%, 80%, 80%, 80%, 80%, 70%, 70%, and 70%. Thus, the representative value (average value) of the absence determination values is 77% and is greater than or equal to the absence threshold. Thus, the determination unit F13 determines that the absence condition is satisfied and that the transmitter 40 is outside the target area. Note that the representative value of the absence determination value is not limited to the average value but may be a median value, the most frequent value, a minimum value, a maximum value, or the like.

In a further variation, the determination unit F13 may determine, in accordance with the result of a previous determination, which of the presence condition and the absence condition is checked at first. That is, following the determination by the determination unit F13 that the transmitter 40 is in the target area, the absence condition may be determined on a priority basis. Following the determination by the determination unit F13 that the transmitter 40 is outside the target area, the presence condition may be determined on a priority basis.

In still a further variation, the presence determination time period and the absence determination time period may be different time periods or may be the same time period. Moreover, the presence threshold and the absence threshold may be the same or different. Moreover, the presence determination time and the absence determination time may be the same or different.

Figure 7:
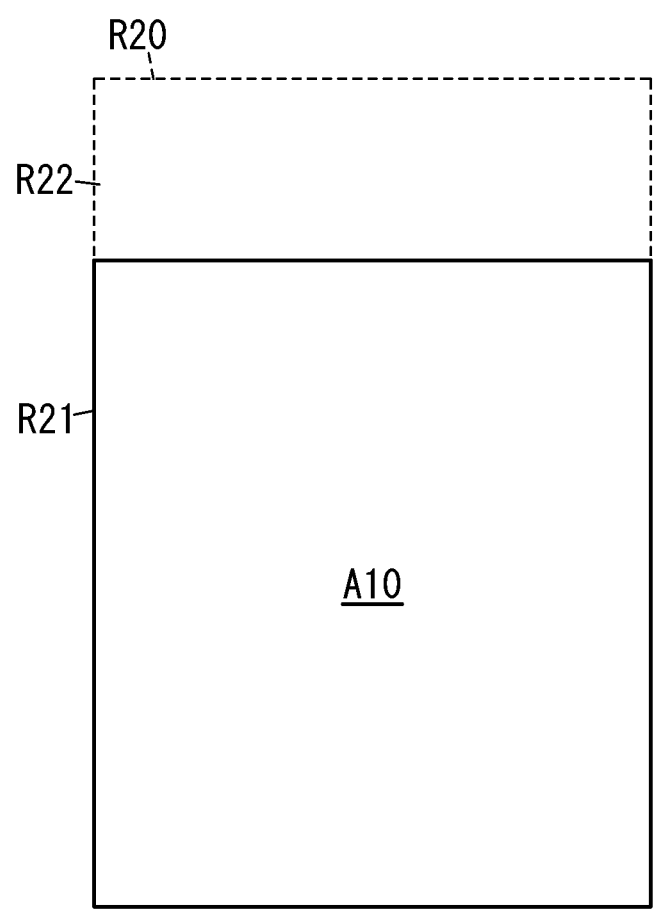
FIG. 7 is a view illustrating an example of an absence determination region in the area determination system.
Figure 8:
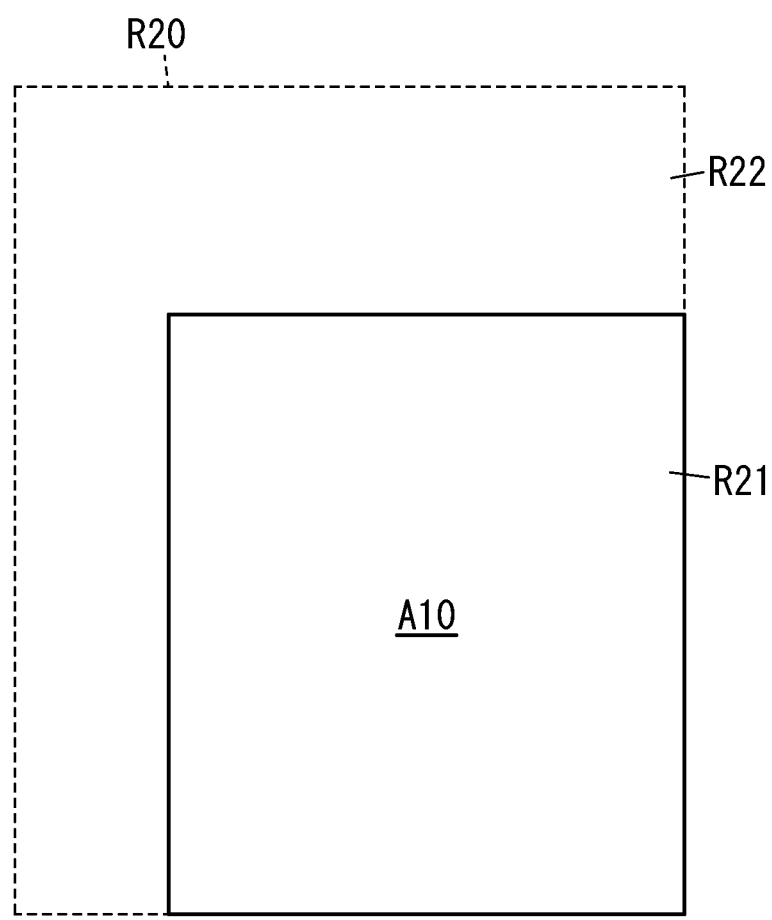
FIG. 8 is a view illustrating another example of the absence determination region in the area determination system.
Figure 9:
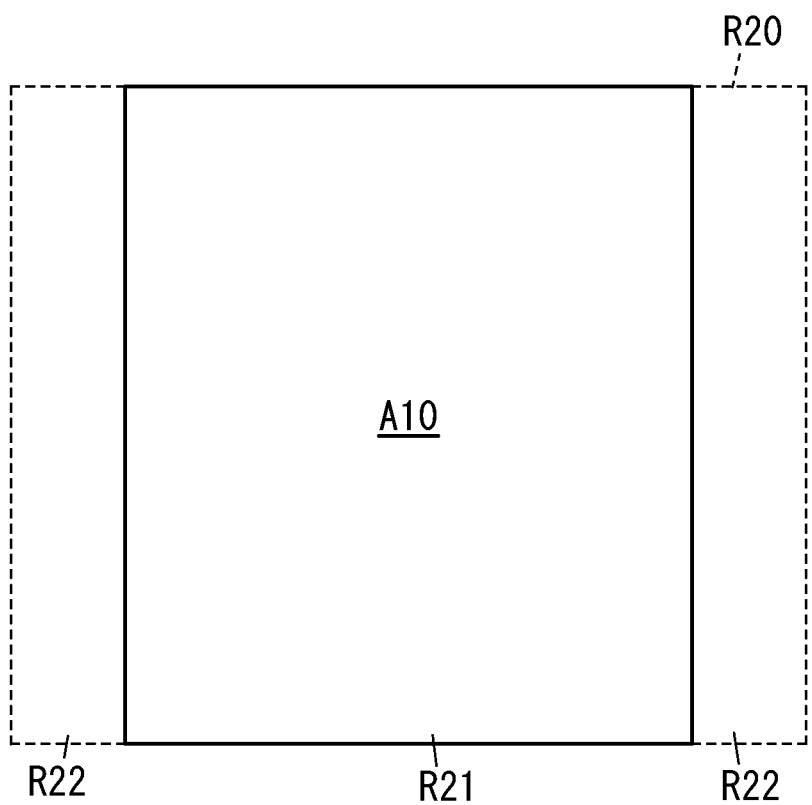
FIG. 9 is a view illustrating still another example of the absence determination region in the area determination system.

In another variation, the extended region R22 does not necessarily have to surround the entire perimeter of the reference region R21. As illustrated in FIG. 7, the extended region R22 may be provided on only one side of the reference region R21. Alternatively, as illustrated in FIGS. 8 and 9, the extended region R22 may be provided on only two sides of the reference region R21. Moreover, the extended region R22 does not have to be one continuous area as shown in FIG. 8 but may include a plurality of separated areas as illustrated in FIG. 9. In particular, the extended region R22 is preferably set to include a place which is a border between a target area and an outer area adjoining the target area and where the person 200 highly possibly moves between the target area and the outer area. Moreover, the absence determination region R20 does not have to include the extended region R22.

In another variation, the presence determination time period may be set not to overlap its directly preceding presence determination time period. For example, the presence determination time period P1 corresponds to five locations L1 to L5 as shown in FIG. 10. The presence determination time period P2 following the presence determination time period P1 corresponds to five locations L6 to L10. Thus, the presence determination time period P1 and the presence determination time period P2 do not overlap each other. Note that this point also applies to the absence determination time period in a similar manner.

In another variation, the calculation unit F12 does not necessarily have to calculate the absence determination value. That is, the determination unit F13 does not have to determine whether or not the absence condition is satisfied.

In another variation, the adjustment unit F14 may use a learned model which has learned the relationship of the locations of the transmitter 40 (the distribution of the locations of the transmitter 40) to any one of the presence determination region R10 or a combination of the presence determination time period and the presence determination time. This enables the adjustment unit F14 to adjust at least one of the presence determination time period, the presence determination time, or the presence determination region R10 with respect to the distribution of locations of the transmitter 40. Thus, the accuracy of determination by the determination unit F13 can be expected to be improved. Note that such a learned model may be generated by, for example, training a program of artificial intelligence on a training dataset including the location of the transmitter 40, and at least one of the presence determination region R10 or the combination of the presence determination time period and the presence determination time so as to cause the program to learn the relationship thereof. As the program (algorithm) of the artificial intelligence, a neural network is adopted which is a model of machine learning and which is one of, for example, hierarchical models. That is, the neural network is trained in machine learning (e.g., deep learning) based on the training dataset, thereby generating the learned model.

In another variation, the adjustment unit F14 may use a learned model which has learned the relationship of the locations of the transmitter 40 (the distribution of the locations of the transmitter 40) to any one of the absence determination region R20 or a combination of the absence determination time period and the absence determination time. This enables the adjustment unit F14 to adjust at least one of the absence determination time period, the absence determination time, or the absence determination region R20 with respect to the distribution of locations of the transmitter 40. Thus, the accuracy of determination by the determination unit F13 can be expected to be improved. Note that such a learned model may be generated by, for example, training a program of artificial intelligence on a training dataset including the location of the transmitter 40, and at least one of the absence determination region R20 or the combination of the absence determination time period and the absence determination time so as to cause the program to learn the relationship thereof. As the program (algorithm) of the artificial intelligence, a neural network is adopted which is a model of machine learning and which is one of, for example, hierarchical models. That is, the neural network is trained in machine learning (e.g., deep learning) based on the training dataset, thereby generating the learned model.

In another variation, the adjustment unit F14 does not have to have the function of adjusting at least one of the presence determination region R10 or a combination of the presence determination time period and the presence determination time. Moreover, the adjustment unit F14 does not have to have the function of adjusting either the absence determination region R20 or a combination of the absence determination time period and the absence determination time. Further, the area determination system 10 does not have to include the adjustment unit F14.

In another variation, the area determination system 10 may define each of two or more of the plurality of areas A10 to A17 in the facility 100 as target areas. That is, the area determination system 10 may determine whether or not the transmitter 40 is present in a plurality of target areas. Alternatively, a target area may include the plurality of areas A10 to A17. In the facility 100 shown in FIG. 3, the areas A16 and A17 may be collectively defined as one target area. Moreover, in the facility 100 shown in FIG. 3, the areas A10, A11, and A12 may be collectively defined as one target area. That is, the target area is not one separated space but may include a plurality of separated spaces. Thus, the target area may be set in accordance with the characteristics and/or the shape of the facility 100.

In another variation, the server 20 does not necessarily have to include the second communication unit 22. The server 20 may include an outputter additionally or alternatively to the second communication unit 22. The outputter is configured to output a result of determination as to whether or not the transmitter 40 is present in the target area. The outputter has at least a function of at least acoustically or visually present the result of the determination. Examples of the outputter include a loudspeaker and a display.

In another variation, the area determination system 10 may include one or more receivers 30 and one or more transmitters 40. However, the one or more transmitters 40 are not essential. Moreover, the one or more receivers 30 are also not essential. In sum, the area determination system 10 does not have to include the receiver 30 or the transmitter 40. That is, the area determination system 10 includes at least the server 20. More specifically, the area determination system 10 includes at least the decision unit F11, the calculation unit F12, and the determination unit F13.

In another variation, the area determination system 10 (server 20) may include a plurality of computers. For example, the functions (in particular, the decision unit F11, the calculation unit F12, the determination unit F13, and the adjustment unit F14) of the area determination system 10 (server 20) may be distributed in a plurality of devices. Moreover, at least some of the functions of the area determination system 10 (server 20) may be realized by, for example, the cloud (cloud calculating).

An execution subject of the area determination system 10 (server 20) described above includes a computer system. The computer system includes, as hardware, a processor and memory. The functions as the execution subject of the area determination system 10 (server 20) according to the present disclosure may be realized by making the processor execute a program stored in the memory of the computer system. The program may be stored in the memory of the computer system in advance or may be provided over a telecommunications network. Alternatively, the program may also be distributed after having been recorded in some non-transitory storage medium such as a memory card, an optical disc, or a hard disk drive, any of which is readable for the computer system. The processor of the computer system includes one or more electronic circuits including a semiconductor integrated circuit (IC) or a large-scale integrated circuit (LSI). A field programmable gate array (FGPA), or an application specific integrated circuit (ASIC), programmable after the manufacturing of an LSI or a reconfigurable logical device that allows reconfiguration of a connection relationship in the interior of an LSI or setup of a circuit section in the interior of the LSI may also be used for the same purpose. The plurality of electronic circuits may be collected on one chip or may be distributed on a plurality of chips. The plurality of chips may be collected in one device or may be distributed in a plurality of devices.

3. Aspects

As can be seen from the embodiment and variations described above, the present disclosure includes the following aspects. In the following description, reference signs in parentheses are added only to clarify the correspondence relationship to the embodiments.

A first aspect is an area determination system (10) including a decision unit (F11), a calculation unit (F12), and a determination unit (F13). The decision unit (F11) is configured to decide, based on a strength of a radio signal (W10) transmitted from a transmitter (40) and received by a receiver (30), a location (L1 to L40) of the transmitter (40). The calculation unit (F12) is configured to calculate a presence determination value. The presence determination value is based on a number of times that the location (L1 to L40) of the transmitter (40) is determined to be in a presence determination region (R10) during a presence determination time period (P1 to P11). The presence determination region (R10) corresponds to a target area (A10). The determination unit (F13) is configured to, when a presence condition is satisfied, determine that the transmitter (40) is in the target area (A10). The presence condition is that a state where the presence determination value is greater than or equal to a presence threshold continues for a presence determination time. This aspect improves the accuracy of determination as to whether or not the transmitter (40) is present in the target area.

A second aspect is based on the area determination system (10) of the first aspect. In the second aspect, the presence determination value is a value based on a ratio of a number of times of determination that the location (L1 to L40) of the transmitter (40) is in the presence determination region (R10) to a number of times of determination as to whether or not the location (L1 to L40) of the transmitter (40) is in the presence determination region (R10). This aspect improves the accuracy of determination as to whether or not the transmitter (40) is present in the target area.

A third aspect is based on the area determination system (10) of the first or second aspect. In the third aspect, the presence determination value corresponds to a probability that the location (L1 to L40) of the transmitter (40) is in the presence determination region (R10) during the presence determination time period (P1 to P11). This aspect improves the accuracy of determination as to whether or not the transmitter (40) is present in the target area.

A fourth aspect is based on the area determination system (10) of any one of the first to third aspects. In the fourth aspect, the determination unit (F13) is configured to, when a number of times of determination that the presence determination value is greater than or equal to the presence threshold is greater than or equal to a number of times of presence, determine that the presence condition is satisfied.

This aspect improves the accuracy of determination as to whether or not the transmitter (40) is present in the target area.

A fifth aspect is based on the area determination system (10) of any one of the first to third aspects. In the fifth aspect, the determination unit (F13) is configured to, when a representative value of the presence determination values in the presence determination time is greater than or equal to the presence threshold, determine that the presence condition is satisfied. This aspect improves the accuracy of determination as to whether or not the transmitter (40) is present in the target area.

A sixth aspect is based on the area determination system (10) of the fifth aspect. In the sixth aspect, the representative value of the presence determination values is an average value of the presence determination values in the presence determination time. This aspect improves the accuracy of determination as to whether or not the transmitter (40) is present in the target area.

A seventh aspect is based on the area determination system (10) of any one of the first to sixth aspects. In the seventh aspect, a presence determination time period of the plurality of presence determination time periods (P1 to P11) is set to partially overlap another presence determination time period directly preceding the presence determination time period and included in the plurality of presence determination time periods (P1 to P11). This aspect improves the accuracy of determination as to whether or not the transmitter (40) is present in the target area.

An eighth aspect is based on the area determination system (10) of any one of the first to seventh aspects. The eighth aspect further includes an adjustment unit (F14) configured to adjust, based on the location (L1 to L40) of the transmitter (40), any one of the presence determination region (R10) or a combination of the presence determination time period (P1 to P11) and the presence determination time. This aspect improves the accuracy of determination as to whether or not the transmitter (40) is present in the target area.

A ninth aspect is based on the area determination system (10) of any one of the first to eighth aspects. In the ninth aspect, the calculation unit (F12) is configured to calculate an absence determination value in accordance with a number of times that the location (L1 to L40) of the transmitter (40) is determined to be outside an absence determination region (R20) during an absence determination time period (P21 to P31). The absence determination region (R20) corresponds to the target area (A10). The determination unit (F13) is configured to, when an absence condition is satisfied, determine that the transmitter (40) is outside the target area (A10). The absence condition is that a state where the absence determination value is greater than or equal to an absence threshold continues for an absence determination time. This aspect improves the accuracy of determination as to whether or not the transmitter (40) is present in the target area.

A tenth aspect is based on the area determination system (10) of the ninth aspect. In the tenth aspect, the presence determination region (R10) and the absence determination region (R20) are different in size with respect to the target area (A10). This aspect improves the accuracy of determination as to whether or not the transmitter (40) is present in the target area.

An eleventh aspect is based on the area determination system (10) of the ninth or tenth aspect. In the eleventh aspect, the absence determination region (R20) includes an extended region (R22) which is not included in the target area (A10). This aspect improves the accuracy of determination as to whether or not the transmitter (40) is present in the target area.

A twelfth aspect is based on the area determination system (10) of any one of the ninth to eleventh aspects. In the twelfth aspect, the absence determination value is a value based on a ratio of a number of times of determination that the location (L1 to L40) of the transmitter (40) is outside the absence determination region (R20) to a number of times of determination as to whether or not the location (L1 to L40) of the transmitter (40) is outside the absence determination region (R20). This aspect improves the accuracy of determination as to whether or not the transmitter (40) is present in the target area.

A thirteenth aspect is based on the area determination system (10) of any one of the ninth to twelfth aspects. In the thirteenth aspect, the absence determination value corresponds to a probability that the location (L1 to L40) of the transmitter (40) is outside the absence determination region (R20) during the absence determination time period (P21 to P31). This aspect improves the accuracy of determination as to whether or not the transmitter (40) is present in the target area.

A fourteenth aspect is based on the area determination system (10) of any one of the ninth to thirteenth aspects. In the fourteenth aspect, the determination unit (F13) is configured to, when a number of times of determination that the absence determination value is greater than or equal to the absence threshold is greater than or equal to a number of absence times, determine that the absence condition is satisfied. This aspect improves the accuracy of determination as to whether or not the transmitter (40) is present in the target area.

A fifteenth aspect is based on the area determination system (10) of any one of the ninth to thirteenth aspects. In the fifteenth aspect, the determination unit (F13) is configured to, when a representative value of the plurality of absence determination values in the absence determination time is greater than or equal to the absence threshold, determine that the absence condition is satisfied. This aspect improves the accuracy of determination as to whether or not the transmitter (40) is present in the target area.

A sixteenth aspect is based on the area determination system (10) of the fifteenth aspect. In the sixteenth aspect, the representative value of the absence determination values is an average value of the absence determination values in the absence determination time. This aspect improves the accuracy of determination as to whether or not the transmitter (40) is present in the target area.

A seventeenth aspect is based on the area determination system (10) of any one of the ninth to sixteenth aspects. In the seventeenth aspect, an absence determination time period of the plurality of absence determination time periods (P21 to P31) is set to partially overlap another absence determination time period directly preceding the absence determination time period and included in the plurality of absence determination time periods (P21 to P31). This aspect improves the accuracy of determination as to whether or not the transmitter (40) is present in the target area.

An eighteenth aspect is based on the area determination system (10) of any one of the ninth to seventeenth aspects. The eighteenth aspect further includes an adjustment unit (F14) configured to adjust, based on the location (L1 to L40) of the transmitter (40), any one of the absence determination region (R20) or a combination of the absence determination time period (P21 to P31) and the absence determination time. This aspect improves the accuracy of determination as to whether or not the transmitter (40) is present in the target area.

A nineteenth aspect is based on the area determination system (10) of any one of the first to eighteenth aspects. In the nineteenth aspect, the area determination system (10) further includes the receiver (30). This aspect improves the accuracy of determination as to whether or not the transmitter (40) is present in the target area.

A twentieth aspect is based on the area determination system (10) of any one of the first to nineteenth aspects. In the twentieth aspect, the area determination system (10) further includes the transmitter (40). This aspect improves the accuracy of determination as to whether or not the transmitter (40) is present in the target area.

A twenty-first aspect is an area determination method including a decision step (S10), a calculation step (S11), and a determination step (S13, S14). The decision step (S10) includes deciding, based on a strength of a radio signal (W10) transmitted from a transmitter (40) and received by a receiver (30), a location (L1 to L40) of the transmitter (40). The calculation step (S11) is a step of calculating a presence determination value in accordance with a number of times that the location (L1 to L40) of the transmitter (40) is determined to be in a presence determination region (R10) during a presence determination time period (P1 to P11). The presence determination region (R10) corresponds to a target area (A10). The determination step (S13, S14) is a step of, when a presence condition is satisfied, determining that the transmitter (40) is in the target area (A10). The presence condition is that a state where the presence determination value is greater than or equal to a presence threshold continues for a presence determination time. This aspect improves the accuracy of determination as to whether or not the transmitter (40) is present in the target area.

A twenty-second aspect is a program configured to cause one or more processors to execute the area determination method of the twenty-first aspect. This aspect improves the accuracy of determination as to whether or not the transmitter (40) is present in the target area.

REFERENCE SIGNS LIST

10 Area Determination System
F11 Decision Unit
F12 Calculation Unit
F13 Determination Unit
F14 Adjustment unit
30 Receiver
40 Transmitter
W10 Radio Signal
L1 to L40 Location
A10 Target Area
R10 Presence Determination Region
R20 Absence Determination Region
R22 Extended Region
P1 to P11 Presence Determination Time Period
P21 to P31 Absence Determination Time Period

The invention claimed is:
1. An area determination system, comprising:
a decision unit configured to decide, based on a strength of a radio signal transmitted from a transmitter and received by a receiver, a location of the transmitter;
a calculation unit configured to calculate a presence determination value based on a number of times that the location of the transmitter is determined to be in a presence determination region during a presence deter- mination time period, the presence determination region corresponding to a target area; and a determination unit configured to, when a presence condition is satisfied, determine that the transmitter is in the target area, the presence condition being that a state where the presence determination value is greater than or equal to a presence threshold continues for a presence determination time, wherein a plurality of the presence determination time periods are set, the calculation unit is configured to calculate a plurality of the presence determination values for the presence determination time periods on a one-to-one basis, and the determination unit is configured to, when a representative value of the presence determination values in the presence determination time is greater than or equal to the presence threshold, determine that the presence condition is satisfied.

2. The area determination system of claim 1, wherein the presence determination value is a value based on a ratio of a number of times of determination that the location of the transmitter is in the presence determination region to a number of times of determination as to whether or not the location of the transmitter is in the presence determination region.

3. The area determination system of claim 1, wherein the presence determination value corresponds to a probability that the location of the transmitter is in the presence determination region during the presence determination time period.

4. The area determination system of claim 1, wherein the representative value of the presence determination values is an average value of the presence determination values in the presence determination time.

5. The area determination system of claim 1, wherein a plurality of the presence determination time periods are set, and a presence determination time period of the presence determination time periods is set to partially overlap another presence determination time period directly preceding the presence determination time period and included in the presence determination time periods.

6. The area determination system of claim 1, further comprising an adjustment unit configured to adjust, based on the location of the transmitter, any one of the presence determination region or a combination of the presence determination time period and the presence determination time.

7. The area determination system of claim 1, further comprising the receiver.

8. The area determination system of claim 1, further comprising the transmitter.

9. An area determination system, comprising:

a decision unit configured to decide, based on a strength of a radio signal transmitted from a transmitter and received by a receiver, a location of the transmitter;

a calculation unit configured to calculate a presence determination value based on a number of times that the location of the transmitter is determined to be in a presence determination region during a presence determination time period, the presence determination region corresponding to a target area; and a determination unit configured to, when a presence condition is satisfied, determine that the transmitter is in the target area, the presence condition being that a state where the presence determination value is greater than or equal to a presence threshold continues for a presence determination time, wherein the calculation unit is configured to calculate an absence determination value in accordance with a number of times that the location of the transmitter is determined to be outside an absence determination region during an absence determination time period, the absence determination region corresponding to the target area, and the determination unit is configured to, when an absence condition is satisfied, determine that the transmitter is outside the target area, the absence condition being that a state where the absence determination value is greater than or equal to an absence threshold continues for an absence determination time.

10. The area determination system of claim 9, wherein the presence determination region and the absence determination region are different in size with respect to the target area.

11. The area determination system of claim 9, wherein the absence determination region includes an extended region which is not included in the target area.

12. An area determination method, comprising:

a decision step of deciding, based on a strength of a radio signal transmitted from a transmitter and received by a receiver, a location of the transmitter;

a calculation step of calculating a presence determination value in accordance with a number of times that the location of the transmitter is determined to be in a presence determination region during a presence determination time period, the presence determination region corresponding to a target area; and a determination step of, when a presence condition is satisfied, determining that the transmitter is in the target area, the presence condition being that a state where the presence determination value is greater than or equal to a presence threshold continues for a presence determination time, wherein a plurality of the presence determination time periods are set, the calculation step includes calculating a plurality of the presence determination values for the presence determination time periods on a one-to-one basis, and the determination step includes, when a representative value of the presence determination values in the presence determination time is greater than or equal to the presence threshold, determining that the presence condition is satisfied.

13. A computer-readable, non-transitory, and tangible recording medium storing a program configured to cause one or more processors to execute the area determination method of claim 12.

14. An area determination method, comprising:

a decision step of deciding, based on a strength of a radio signal transmitted from a transmitter and received by a receiver, a location of the transmitter;

a calculation step of calculating a presence determination value in accordance with a number of times that the location of the transmitter is determined to be in a presence determination region during a presence determination time period, the presence determination region corresponding to a target area; and a determination step of, when a presence condition is satisfied, determining that the transmitter is in the target area, the presence condition being that a state where the presence determination value is greater than or equal to a presence threshold continues for a presence determination timer, wherein the calculation step includes calculating an absence determination value in accordance with a number of times that the location of the transmitter is determined to be outside an absence determination region during an absence determination time period, the absence determination region corresponding to the target area, and the determination step includes, when an absence condition is satisfied, determining that the transmitter is outside the target area, the absence condition being that a state where the absence determination value is greater than or equal to an absence threshold continues for an absence determination time.

15. A computer-readable, non-transitory, and tangible recording medium storing a program configured to cause one or more processors to execute the area determination method of claim 14.

* * * * *